United States Patent [19]

Yamamoto et al.

[11] Patent Number: 4,887,114

[45] Date of Patent: Dec. 12, 1989

[54] BACK-COVER RELEASE DEVICE FOR A CAMERA

[75] Inventors: Masato Yamamoto; Masahiro Nakajima; Toshimasa Yamanaka, all of Tokyo, Japan

[73] Assignee: Asahi Kogaku Kogyo Kabushiki Kaisha, Tokyo, Japan

[21] Appl. No.: 320,660

[22] Filed: Mar. 8, 1989

[30] Foreign Application Priority Data

Mar. 11, 1988 [JP] Japan .................... 63-32281[U]

[51] Int. Cl.4 ............................................. G03B 17/02
[52] U.S. Cl. ................................................. 354/288
[58] Field of Search ............................. 354/288, 202

[56] References Cited

U.S. PATENT DOCUMENTS 3,096,699 7/1963 Harvey et al. .................. 354/288
4,572,641 2/1986 Ishihara et al. ................. 354/288

FOREIGN PATENT DOCUMENTS 60-37537 2/1985 Japan ............................. 354/288

*Primary Examiner*—L. T. Hix
*Assistant Examiner*—Brian W. Brown

*Attorney, Agent, or Firm*—Sughrue, Mion, Zinn, Macpeak & Seas

[57] ABSTRACT

A release device for unlocking the back-cover of a camera includes a back-cover lock member urged in a direction to lock the back-cover, an operating lever pivotally disposed along a side of the camera and operable externally of the camera so as to be angularly displaced therefrom and an interlocking plate for interlocking the operating lever with the back-cover lock member. The operating lever is engageable with the interlocking plate after the operating lever is angularly rotated through a predetermined preliminary angle in an opening direction from a position where the operating lever is disposed along the camera body so as to displace the interlocking plate and to correspondingly displace the lock member to thereby unlock the back-cover. The interlocking plate is interlocked with a film rewind shaft so as to move the film rewind shaft in a direction to disengage the shaft from a film cartridge in accordance with the movement of the back-cover lock member to its unlocked position when the operating lever has been rotated beyond the predetermined preliminary angle.

4 Claims, 2 Drawing Sheets

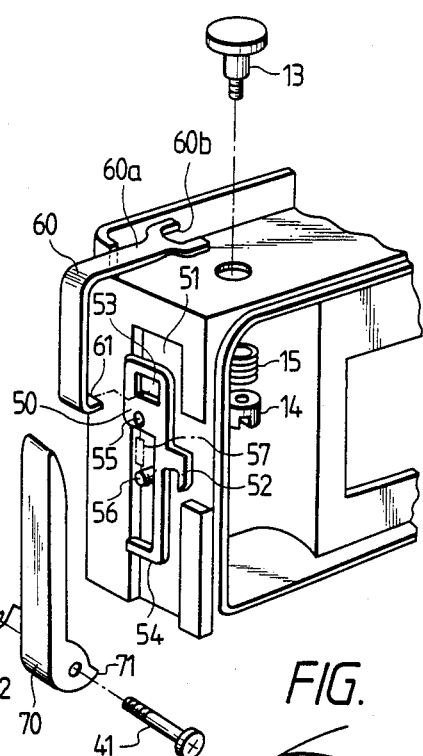
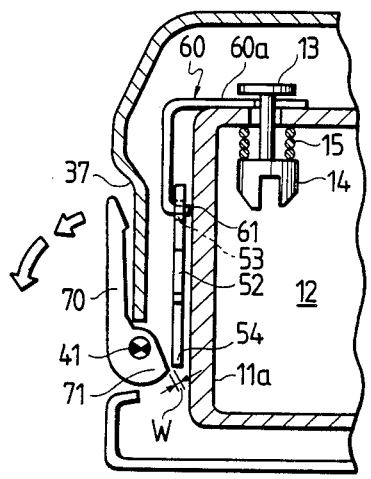
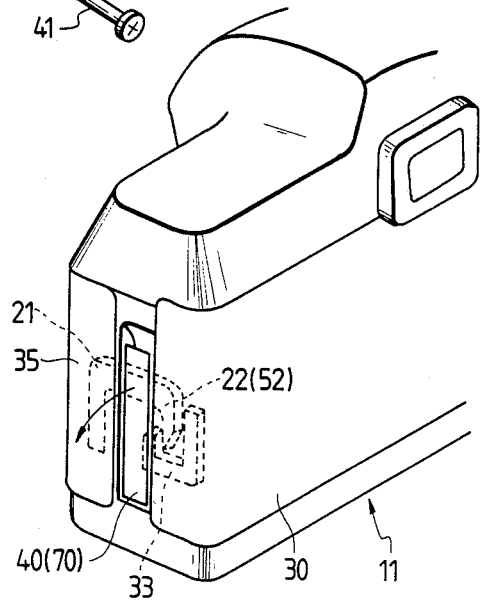

BACK-COVER RELEASE DEVICE FOR A CAMERA

BACKGROUND OF THE INVENTION

1. Field of the Invention

This invention relates to improvements in a device for releasing the back-cover of a camera.

2. Background

Generally, in conventional back-cover release devices of this type, an operating member of the slide type for releasing the locking of the back cover is used in order to prevent an accidental opening of the back cover. Such a back-cover release device is designed to be manipulated by a finger pad and hence has a poor manipulatability. Further, since the amount of sliding movement required for releasing the locking is small, there is a risk that the back-cover is inadvertently released. In order to avoid such risk, there has also been proposed the type of release devices having a lock means for the slide member, which has led to a complicated construction of the device.

SUMMARY OF THE INVENTION

It is therefore an object of this invention to provide a back-cover release device of the type which has a good manipulatability and does not allow a locked back cover to be released even if an operating member is moved slightly.

Another object is to provide such a device in which only the operation of an operating member enables the removal of a film cartridge.

These and other objects, which will become apparent from the ensuing description of the preferred embodiment of the invention, are accomplished according to the present invention by a back-cover release device for a camera comprising a back-cover lock member urged in a direction to lock the back cover; an operating lever which is normally disposed along a side of a camera body and is operable externally of the camera so as to be angularly moved; and an interlocking plate for interlocking the operating lever with the back-cover lock member, the operating lever being engagable with the interlocking plate after the operating lever is angularly moved through a predetermined preliminary angle in its opening direction from a position where the operating member is disposed along the camera body.

The present invention can also be constructed as follows: More specifically, according to the present invention, there is also provided a back-cover release device for a camera comprising a back-cover lock member urged in a direction to lock the back cover; and an operating lever which is normally disposed along a side of a camera body and is operable externally of the camera so as to be angularly moved, the operating lever being engagable with the interlocking plate after the operating lever is angularly moved through a predetermined preliminary angle in its opening direction from a position where the operating member is disposed along the camera body.

BRIEF DESCRIPTION OF THE DRAWINGS

FIG. 3 is an exploded perspective view of a second embodiment of the invention;

FIG. 4 is a cross-sectional view thereof in an assembled condition; and

FIG. 5 is a perspective view of a camera incorporating the device of both embodiments of the present invention, as seen from the back side of the camera.

DETAILED DESCRIPTION OF THE INVENTION

The invention will now be described with reference to the illustrated embodiments.

Figure 1:
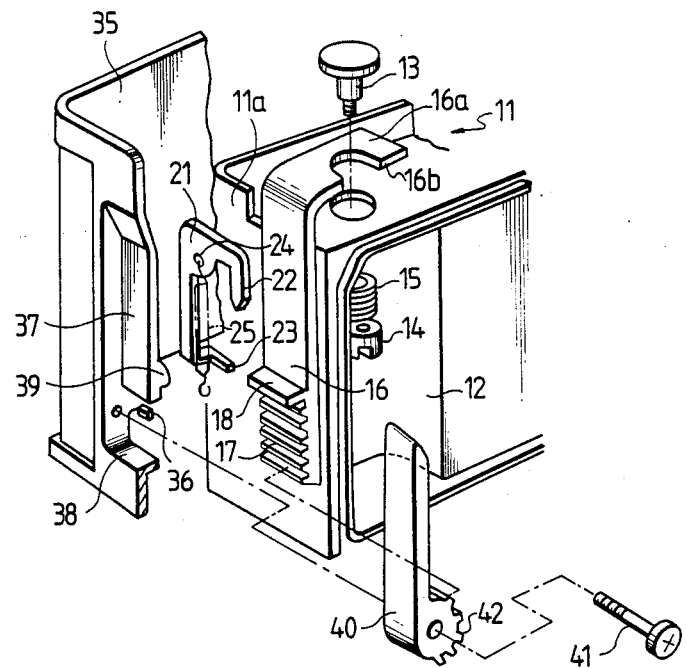
FIG. 1 is an exploded perspective view of a first embodiment of the invention.
Figure 2:
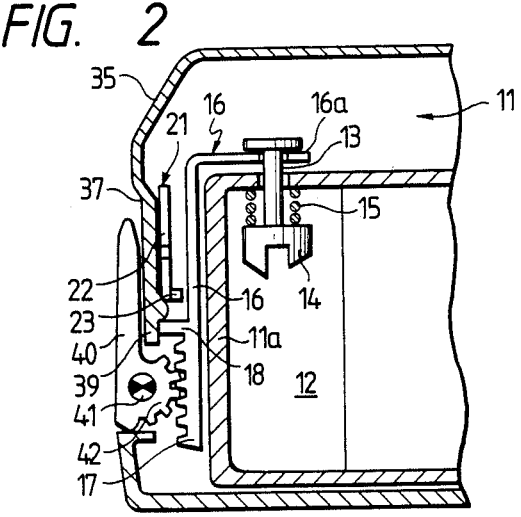
FIG. 2 is a cross-sectional view thereof in an assembled condition.

FIGS. 1 and 2 show a first embodiment of the present invention. A camera body includes a film compartment 12 having a fork 14 disposed therein at an upper portion thereof. The fork 14 is fixedly secured to a film rewind shaft 13 and urged downwardly by a compression spring 15. A film cartridge (not shown) to be loaded into the film compartment 12 is adapted to be engaged with the fork 14.

An interlocking plate 16 having an L-shape is disposed adjacent to an outer surface of a side wall 11a of the camera body 11 for sliding movement in upward and downward directions along the side wall 11a. Formed in an upper bent portion 16a of the interlocking plate 16 is a U-shaped notch 16b in which the rewind shaft 13 is disposed. Therefore, when the interlocking plate 16 is slidingly moved upwardly, the bent portion 16a urges the rewind shaft 13 in a direction to withdraw it against the bias of the compression spring 15 to thereby disengage the fork 14 from the film cartridge. A rack 17 as well as a push projection 18 for pushing a back-cover lock member 21 upwardly are formed on an outer surface of the lower portion of the interlocking plate 16.

The back-cover lock member 21 serves to lock and unlock a back cover 30 as shown in FIG. 5. The lock member 21 has a locking pawl 22 engageable with a key plate portion 33 of the back cover 30 and an interlocking bent portion 23 engageable with the push projection 18. The back-cover lock member 21 is disposed between a side wall of a front decorative cover 35 and the interlocking plate 16 and is urged in a direction to lock the back-cover 30 by a tension spring 25 extending between a spring retainer aperture 24 of the lock member 21 and a spring retainer projection 36 formed on an inner surface of the lower end of the front decorative cover 35.

A lever-receiving recess 37 is formed in the outer surface of the side wall of the front decorative cover 35, and an operating window 38 is formed in the side wall below the lever-receiving recess 37.

An operating lever 40 is pivotally received in the lever-receiving recess 37. The operating lever 40 is pivotably mounted on a pivot shaft 41 disposed at a central portion of the operating window 38 so that the lever can be angularly moved in a direction of the arrows shown in FIG. 2, that is, in the opening direction away from the lever-receiving recess 37. The pivot portion of the operating lever 40 has a pinion 42 in mesh with the rack 17 of the interlocking plate 16. Therefore, when the operating lever 40 is angularly moved in the opening direction, the interlocking plate 16 is slidingly moved upwardly through the pinion 42 and the rack 17 meshingly engaged therewith.

A convex-arcuate stop portion 39 is formed on the inner surface of the lever-receiving portion 37 facing the interlocking plate 16. The stop portion 39 is engageable with the push projection 18, and upon a slight upward sliding movement of the interlocking plate 16, the stop portion 39 frictionally engages the push projection 18 to thereby hold the operating lever 40 in the preliminary angularly-opened position and to prevent the interlocking plate 16 from returning to its original position under the influence of the compression spring 15. With this construction of the back-cover release device, when the operating lever 40 is first slightly angularly moved in the opening direction, the interlocking plate 16 is slightly moved slidingly upwardly through the pinion 42 and the rack 17, so that the push projection 18 frictionally rides on and engages the stop portion 39 and is held against the interlocking bent portion 23. In this condition, the operating lever 40 is in the preliminary angularly-opened position. Since the back-cover lock member 21 maintains the back-cover 30 in the locked condition, the back-cover 30 will not be opened by an inadvertent manipulation of the operating lever 40. Also, even if the operating force applied to the operating lever 40 is released at this time, the downward sliding returning movement of the interlocking plate 16 is prevented by the engagement of the push projection 18 with the stop portion 39. When the operating lever 40 is further angularly moved in the opening direction to increase the operating force, the push projection 18 engages the interlocking bent portion 23 in accordance with the upward sliding movement of the interlocking plate 16 to push the back-cover lock member 21 upwardly, thereby moving the back-cover lock member 21 in a lock-releasing direction against the bias of the tension spring 25. Simultaneously, the bent portion 16a lifts the fork 14 via the rewind shaft 13 to disengage the fork 14 from the film cartridge. At this time, the engagement of the locking pawl 22 with the key plate portion 33 of the back-cover 30 is released, thereby unlocking the back-cover 30 from the camera body 11 and facilitating the removal of the film cartridge from the film compartment 12

When the force applied to the operating lever 40 is released, the back-cover lock member 21 is moved downwardly under the influence of the tension spring 25, so that the interlocking bent portion 23 urges the push projection 18 downwardly to correspondingly slidingly move the interlocking plate 16 downwardly. However, since the push projection 18 is brought into engagement with the stop portion 39, the downward sliding movement of the interlocking plate 16 is limited. At this time, the operating lever 40 has been angularly moved in the reverse direction and returned to the preliminary angularly-opened position relative to the lever-receiving recess 37. In this condition, the back-cover 30 is closed engaging the key plate portion 33 of the back cover with the locking pawl 22. Thus, the back-cover 30 is again in the locked condition. Thereafter, when the operating lever 40 is further angularly moved toward the lever-receiving recess 37, the engagement of the push projection 18 with the stop portion 39 is released, so that the operating lever 40 is returned to the original position.

FIGS. 3 and 4 show a second embodiment of the present invention. In this embodiment, a back-cover lock member 50 is mounted in a receiving recess 51 formed in a side wall 11a. The back-cover lock member 50 has at a central portion thereof a locking pawl 52 engageable with the key plate portion 33 of the back-cover 30, an interlocking aperture 53 of a square shape at an upper portion thereof, and an interlocking bent portion 54 at a lower end thereof. The lock member 50 is urged in a locking direction by a tension spring 57 extending between a spring retainer aperture 55 of the lock member 50 and a spring retainer pin 56 projecting from the receiving recess 51. An interlocking plate 60 for lifting the fork 14 has an upper bent portion 60a having a notch 60b of a U-shaped contour in which the rewind shaft 13 is fitted, and a lower bent portion 61 provided at the lower end of the interlocking plate 60 which is loosely fitted in the square interlocking aperture 53 so as to be engageable with the edge of the aperture 53. An operating lever 70 for moving the back-cover lock member 50 in a lock-releasing direction is pivotally mounted on a pivot shaft 41 so as to be angularly movable in the opening direction away from a lever-receiving recess 37, as indicated by the arrows in FIG. 4, the operating lever 70 having a push claw 71 abuttable against the lower edge of the interlocking bent portion 54. The operating lever 70 is urged toward the lever-receiving recess 37 by a torsion spring 72 wound around the pivot shaft 41. A gap W is provided between the push claw 71 and the interlocking bent portion 54 so as to allow the operating lever 70 to be slightly angularly moved in an idle manner to a preliminary angularly-opened position.

In the above second embodiment, even when the operating lever 70 is angularly moved to the preliminary angularly-opened position, this angular movement is idle because of the provision of the gap W. Therefore, even if the operating lever 70 is inadvertently manipulated, the back-cover 30 will not immediately be opened. If the operating force applied to the operating lever 70 is released in this condition, the operating lever 70 is angularly returned to its original position under the influence of the spring 72. When the operating lever 70 is angularly moved through a large angle, the push claw 71 is brought into abutting engagement with the interlocking bent portion 54 to push the interlocking bent portion 54 upwardly. As a result, the back-cover lock member 50 is moved upwardly, that is, in the lock-releasing direction, against the bias of the tension spring 57, and simultaneously the edge of the square interlocking aperture 53 is brought into engagement with the bent portion 61 to push the interlocking plate 60 upwardly. As a result, the engagement of the locking pawl 52 with the key plate portion 33 of the back-cover 30 is released to open the back-cover 30, and at the same time, the interlocking plate 60 lifts the fork 14 through the rewind shaft 13 to disengage the fork from the film cartridge, thus facilitating the removal of the film cartridge.

When the operating force applied to the operating lever 70 is released, the back-cover lock member 50 is returned to its original position under the influence of the tension spring 57, and also the operating lever 70 is returned to its original position under the influence of the spring 72. Then, when the back-cover 30 is closed, the key plate portion 33 of the back-cover becomes engaged with the locking pawl 52 to hold the back-cover in its locked condition. At this time, the operating lever 70 is not angularly moved.

As described above, the operating levers of the back-cover release devices of the present invention are of the angularly-movable type. Unless the operating lever is angularly moved beyond the preliminary angularly-opened position, the back-cover lock member will not be released from its locked condition. Therefore, the operability is improved, and the risk of opening the back-cover due to inadvertent manipulation is reduced. Further, only with the angular movement of the operating lever, the disengagement of the fork from the film cartridge is performed at the same time.

We claim:

1. A back-cover release device for unlocking a back-cover of a camera, comprising:
   a back-cover lock member urged in a direction to lock the back-cover;
   an operating lever pivotably disposed along a side of said camera and operable externally of the camera so as to be angularly displaced therefrom; and
   an interlocking plate for interlocking the operating lever with the back-cover lock member, the operating lever being engageable with the interlocking plate after the operating lever is angularly rotated through a predetermined preliminary angle in an opening direction from a position where the operating lever is disposed along the camera body so as to displace said interlocking plate and to correspondingly displace said lock member to unlock said back-cover.

2. A back-cover release device for a camera according to claim 1, in which the interlocking plate is interlocked with a film rewind shaft so as to move the film rewind shaft in a direction to disengage said shaft from a film cartridge in accordance with the movement of the back-cover lock member to its unlocked position.

3. A back-cover release device for unlocking a back-cover of a camera, comprising:
   a back-cover lock member urged in a direction to lock the back-cover; and
   an operating lever which is pivotally disposed along a side of a camera body and operable externally of the camera so as to be angularly displaced therefrom, the operating lever being engageable with a portion of said back-cover lock member after the operating lever is angularly moved through a predetermined preliminary angle in an opening direction from a position where the operating member is disposed along the camera body so as to move said lock member in the unlocking direction.

4. A back-cover release device for a camera according to claim 3, further comprising an interlocking plate to which the back-cover lock member is interlocked, said interlocking plate being correspondingly interlocked with a film rewind shaft, wherein when said operating lever is rotated beyond said preliminary angle, said interlocking member moves said film rewind shaft in a direction to disengage said shaft from a film cartridge in accordance with the movement of said back-cover lock member to its unlocked position.

* * * * *